US008050957B2

(12) United States Patent
Woehler (10) Patent No.: US 8,050,957 B2
(45) Date of Patent: Nov. 1, 2011

(54) SYSTEMS AND METHODS FOR PLANNING DEMAND FOR CONFIGURABLE PRODUCTS

(75) Inventor: Christian Woehler, Heidelberg (DE)

(73) Assignee: SAP AG, Walldorf (DE)

( * ) Notice: Subject to any disclaimer, the term of this patent is extended or adjusted under 35 U.S.C. 154(b) by 1098 days.

(21) Appl. No.: 11/008,196

(22) Filed: Dec. 10, 2004

(65) Prior Publication Data

US 2005/0159995 A1     Jul. 21, 2005

(30) Foreign Application Priority Data

Dec. 12, 2003    (EP) ..................................... 03078944

(51) Int. Cl.
     *G06Q 10/00*      (2006.01)
(52) U.S. Cl. ..................................................... 705/7.25
(58) Field of Classification Search ................... 705/7.25
     See application file for complete search history.

(56) References Cited

U.S. PATENT DOCUMENTS

| | | | |
|---|---|---|---|
| 5,299,115 A | | 3/1994 | Fields et al. |
| 5,311,424 A | * | 5/1994 | Mukherjee et al. ............. 705/29 |
| 5,327,340 A | | 7/1994 | Kaneko et al. |
| 5,675,784 A | * | 10/1997 | Maxwell et al. .............. 707/100 |
| 5,764,557 A | | 6/1998 | Hara et al. |
| 5,953,707 A | * | 9/1999 | Huang et al. ..................... 705/10 |
| 5,970,476 A | * | 10/1999 | Fahey ............................. 705/28 |
| 5,971,585 A | * | 10/1999 | Dangat et al. ................. 700/102 |
| 5,974,395 A | | 10/1999 | Bellini et al. |
| 6,816,839 B1 | * | 11/2004 | Gung et al. ..................... 705/10 |
| 6,876,895 B2 | * | 4/2005 | Seimiya et al. ............... 700/106 |

(Continued)

FOREIGN PATENT DOCUMENTS

WO    WO 02/37376      5/2002

(Continued)

OTHER PUBLICATIONS

Mingyuan Chen and Weimin Wang, A linear programming model for integrated steel production and distribution planning, 1997, International Journal of Operations & Production Management, vol. 17n6, pp. 592.*

(Continued)

*Primary Examiner* — Johnna Loftis
*Assistant Examiner* — Brandi P Parker
(74) *Attorney, Agent, or Firm* — Finnegan, Henderson, Farabow, Garrett & Dunner LLP (57) ABSTRACT

Systems and methods are provided for planning demand of a product, such as a configurable product. In one embodiment, a method is provided for planning demand for a configurable product in a managed supply chain. In another embodiment, a demand planner is provided for planning demand for a configurable product in a managed supply chain. The method may comprise the steps of: providing a data storage system to store data relating to a plurality of configurable products in terms of their respective product dependent characteristics; inputting a selection to be represented for a plurality of products in terms of percentage values for a particular product dependent characteristic, wherein the percentage values relate to respective components or qualities of the particular product dependent characteristic; in response to the inputting step, loading data for the plurality of products from the data storage system on at least the product level; copying the percentage values for the respective components or qualities to the product level; and performing the percentage calculation on the loaded data at the product level to obtain absolute values on the product level.

20 Claims, 2 Drawing Sheets

U.S. PATENT DOCUMENTS

| | | | |
|---|---|---|---|
| 7,039,602 B1 | 5/2006 | Kapadia et al. | |
| 7,058,587 B1* | 6/2006 | Horne | 705/7 |
| 7,260,550 B1 | 8/2007 | Notani | |
| 7,539,630 B2 | 5/2009 | Crampton et al. | |
| 2002/0099583 A1* | 7/2002 | Matusek et al. | 705/7 |
| 2002/0103686 A1* | 8/2002 | Slocum | 705/8 |
| 2002/0178077 A1* | 11/2002 | Katz et al. | 705/26 |
| 2005/0038542 A1* | 2/2005 | Kern | 700/105 |
| 2005/0159971 A1 | 7/2005 | Woehler | |

FOREIGN PATENT DOCUMENTS

| | | |
|---|---|---|
| WO | WO 03/040865 | 5/2003 |

OTHER PUBLICATIONS

Hyperion, "The Role of the OLAP Server in a Data Warehousing Solution," White Paper, Online!, Nov. 30, 1999, XP002276702 DM Review, Retrieved from Internet: URL: http://www.dmreview.com/whitepa.pdf>, retrieved on Apr. 7, 2004, pp. 3-18, and cover and end sheets.

Microsoft, "T3 Project Technical Overview," White Paper, Online!, Feb. 2001, XP002276703 Retrieved from the Internet: URL: http://datawarehouse.ittoolbox.com/pub/A0031802b.pdf>, retrieved on Apr. 7, 2004, pp. 1-26, and cover sheet and table of contents.

Jim Acker et al., "PROLAP—A Programmatic Approach to Online Analytical Processing," Seattle SAS® Users Group International Proceedings, Mar. 30, 2003, pp. 1-3.

Microstrategy, "The Case for Relational OLAP," White Paper, Online! 1995, XP002276705, Retrieved from the Internet: URL: http://www.datawarehouse.com/iknowledge/whitepapers/microstrategy_211.pdf>, retrieved on Apr. 7, 2004, pp. 1-20, and cover sheet and table of contents.

Anonymous, "Getting Started With OLAPWork for Microsoft Excel," White Paper, 1999, Section 1.4.2, pp. 1-25.

* cited by examiner

SYSTEMS AND METHODS FOR PLANNING DEMAND FOR CONFIGURABLE PRODUCTS

BACKGROUND OF THE INVENTION

I. Field of the Invention

The present invention generally relates to computerized planning systems and methods, and to such systems and methods for planning demand for products, such as configurable products. More particularly, the invention relates to planning systems and methods for planning demand for a configurable product in a managed supply chain.

II. Background Information

Demand planning is used to forecast the demand for products, such as configurable products. A configurable product is a product having one or more product dependent characteristics. In demand planning, it is known to carry out aggregation and disaggregation calculations. Aggregation is a function by which key figure values on the lowest level of detail are automatically summed at run time and displayed on a high level. For example, if a forecasted demand is displayed for a region in an interactive planning screen, the forecasted demand for all of the different sales channels, product families, brands, products, and/or customers in that region is shown. This provides a consistent planning approach throughout an organization. Key figure values can be stored at the lowest level of detail. If aggregates are used, then the data may also be saved on the aggregate levels.

On the other hand, disaggregation is a function by which a key figure value on a high level is automatically broken down to the detailed level. For example, if demand is forecast in a particular region, the system instantly splits up this number among the different sales channels, product families, brands, products, customers, and so on, in this region. This function, as with aggregation, provides a consistent planning approach throughout an organization. As with aggregation, key figure values can be stored at the lowest level of detail. If aggregates are also used, then the data may also be stored on the aggregate levels.

With both the aggregation and disaggregation functions, a demand plan can be carried out on the basis of a percentage representation. It has been found, however, that conventional demand planning incorporating the aggregation and disaggregation functions suffers from one or more drawbacks. One problem is that with the aggregation and disaggregation calculation for the percentage representation implemented in the demand planning, it is not possible to work with an aggregate of more than one product in the same way as working with the aggregate of one product. It has been found that this is because the calculation logic is the same for the percentage representation and the absolute value representation. It has also been found that this problem occurs because in a planning scenario where the components of configurable products are planned, a different calculation logic has been found to be required in the percentage representation in order to work with a group of products in a desired way. In conventional demand planners until now it has been necessary to work only with a single product at a time and copy the data to each product. This is very time consuming and error-prone manual work.

In view of the foregoing, it is an object of the present invention to address these and other problems encountered in conventional demand planning incorporating a percentage representation.

SUMMARY OF THE INVENTION

Consistent with embodiments of the present invention, computerized systems and methods are disclosed for planning demand for products, such as configurable products. In accordance with one aspect, demand planning is performed with a percentage representation.

According to one embodiment, a method is provided for planning demand for a configurable product having at least one product dependent characteristic in a managed supply chain. The method may comprise the steps of: providing a data storage system to store data relating to a plurality of configurable products in terms of their respective product dependent characteristics; inputting a selection to be represented for a plurality of products in terms of percentage values for a particular product dependent characteristic, wherein the percentage values relate to respective components or qualities of the particular product dependent characteristic; in response to the inputting step, loading data for the plurality of products from the data storage system on at least the product level; copying the percentage values for the respective components or qualities to the product level; and performing the percentage calculation on the loaded data at the product level to obtain absolute values on the product level. Using this method, more than one product may be maintained.

According to another embodiment of the invention, a demand planner is provided for planning demand for a configurable product having at least one product dependent characteristic in a managed supply chain. The demand planner may be operatively associated with a data storage system to store data relating to a plurality of configurable products in terms of their respective product dependent characteristics. Further, the demand planner may be operatively associated with a user interface for receiving input of a selection to be represented for a plurality of products in terms of percentage values for a particular product dependent characteristic, wherein percentage values may relate to respective components or qualities of the particular product dependent characteristic. As disclosed herein, the demand planner may comprise a storage medium having recorded therein processor readable code processable to plan demand for a configurable product in a managed supply chain, the code comprising: data loading code processable to load data in response to the selection for the plurality of products from the data storage system on at least the product level; copying code processable to copy the percentage values for the respective components or qualities to the product level; and calculation performing code processable to perform a percentage calculation on the loaded data at the product level to obtain absolute values on the product level.

Embodiments of the invention also relate to computerized systems and other environments for implementing the steps of the above-described method and/or containing the components of the above-described demand planner. Embodiments of the invention also encompass user terminals comprising means operable to perform one or more steps of the above-described method.

Consistent with the present invention, embodiments may also be provided that include a computer readable medium or a program storage device readable by a processing apparatus, the computer readable medium or program storage device embodying a program of instructions executable by the processor to perform the steps of methods consistent with the present invention.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects consistent with the present invention. In the drawings.

DETAILED DESCRIPTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Characteristic Based Forecasting (CBF) is a technique used in demand planning. In CBF, a set of characteristics is defined in order to forecast components of assembled products. The set of characteristics is called the CBF characteristics, and may also be referred to as the product dependent characteristics. For example, if the product is a car, the product dependent characteristics of the car may include color and engine size. Products having product dependent characteristics are referred to as configurable products. In demand planning, however, other product characteristics are also typically taken into account, such as sales region and customer channels. Such other product characteristics are referred to as product independent characteristics or "free" characteristics.

Using the CBF planning process in a demand planning (DP) component implies the following structure: free characteristics, for example, location and sales region, are used to describe product independent characteristics and CBF characteristics defined in the profile for each product individually are used to describe product components such as, for example, the memory or central processing unit (CPU) of a computer.

In the following description, certain expressions are used, which are known to persons skilled in the art of demand planning and supply chain management. Thus, by way of example, only and in a non-limiting manner, the following explanation of certain expressions is included.

Typically, a selection is made by a user and specifies some characteristic values or not (in which case all the data is aggregated) and thereby defines a set of characteristic value combinations, which may be referred to as "CVC." The number displayed then just represents a number for each time period over which a demand is planned (i.e., a time bucket).

The set of characteristic value combinations expresses the characteristics a product or component may have, for example, the product "computer A" may be defined as having a product dependent characteristic, "hard disc" of component type 40 GB. The characteristic value combinations are stored as master data. Transactional data, on the other hand, is the planning data and will vary depending on the particular demand plan being carried out.

A drill down (also referred to as a DrillDown) is a function which represents a more detailed view of the data of the selection which respect to one or more characteristic(s), that is the data are grouped by the characteristic values.

CVC fall into the group of master data and the planning values stored in a data storage system are transaction data. In CBF, the loading of selections and the saving of them is typically the only interaction with the data storage system.

In demand planning, the percentage representation refers to the expression of a characteristic value as a percentage of a total, whereas the absolute representation refers to the expression of the characteristic value in terms of a number.

According to an embodiment of the present invention, the planning of components for complex products is possible in percentage representation for an aggregate of more than one product. This means that the percentage values maintained for the components of an aggregate are copied to the components of the individual products of the aggregate. This is not possible with conventional demand planners where the changes are disaggregated in the same way in the percentage representation as in the absolute value representation. However, according to an embodiment of the present invention, the use of a percentage disaggregation calculation is disclosed which is specifically designed for the percentage representation and which allows for the planning of components for complex products in a percentage representation.

In the following description, a specific embodiment of the present invention is given. Further contrasting examples with conventional demand planning applications are given, in order to demonstrate advantages of embodiments of the present invention with respect to a conventional demand planning application and, in particular, to demonstrate the function and advantages achieved by the percentage representation provided by one embodiment of the present invention.

Demand planning may be performed for a configurable product, such as: computer model "A1" with the characteristic: "CPU" having the following values "P2", "P3", and "P4". For purposes of illustration, assume that in the next month, one thousand computers A1 with the following values for the different CPUs: P2, P3, and P4 are planned 1000->(200, 500, 300), that is for a total of 1000 "A1" computers 200 of these computers are planned as having a CPU "P2", 500 are planned as having a CPU "P3" and 300 are planned as having a CPU "P4". The percentage representation of these values is 100%->(20%, 50%, 30%), that is of the 1000 computers planned for 20% are planned as having a CPU "P2", 50% are planned as having a CPU "P3" and 30% are planned as having a CPU "P4".

Further, in this example, assume that the product family, of which computer A1 is a member includes: computer models A1 and A2, wherein A1 and A2 have characteristic values for characteristic CPU: P2, P3, and P4.

For this exemplary product family, the planning on the aggregate of the product family gives the following results using conventional percentage representation: if it is planned for the total of 1000 computers for model A1 and 2000 for model A2 and the percentages with respect to the CPUs are to be specified as above and on product family level the input would be 100%->(20%, 50%, 30%). However, this input does not in general result in the desired absolute values, which are: 1000->(200, 500, 300) for A1 and 2000->(400, 1000, 600) for A2.

Using conventional percentage representation, a proportional disaggregation would give the desired result only in special cases, i.e., if previously the proportions for both of the two products were the same for each CPU value, for example, if demand were planned for 1000 A1 computers and 1000 A2 computers. Embodiments of the present invention can address the problem, that the user would like to be sure that the percentage values which he/she maintained for the aggregate product family are also valid for the individual products of the product family. In addition, embodiments of the present invention are applicable to situations where depending on the previous values also a result like 1000->(500, 500, 0) for A1 and 2000->(100, 1000, 900) for A2 may be possible. In order to demonstrate this, it is assumed that a second change on product family level to 100%->(0%, 50%, 50%). In this case, the results on the detailed level are 500->(0, 500, 0) and 2500->(0, 1000, 1500) because the 50% for P4 would be disaggregated according to the proportion for each product and since the A1 had a zero value for P4 it would not be considered in the distribution of the 1500 pieces of P4. In contrast to this conventional result, the desired result—and also that achieved according to an embodiment of the present invention—is 1000->(0, 500, 500) and 2000->(0, 1000, 1000) wherein the percentage values are copied directly from the aggregated level (product family level) to the product level.

The discrepancy between the result of conventional calculation logic and that achieved by embodiments of the present invention is even larger in the following case:

Where the product family includes a third computer model: A3 with only the CPU values P3 and P4. In this case, conventional disaggregation gives undesired results even if the values have all been zero before 3000 was entered as the total for the product family and it was disaggregated in the following way:

1000->(333, 334, 333) for A1,
1000->(333, 334, 333) for A2, and
1000->(0, 500, 500) for A3.

The input for product family is again in percentage representation 100%->(20%, 50%, 30%) and the results on the detailed level, that is, the numbers of items of the products to be produced, are 1000->(300, 429, 257) for A1, 1000->(300, 429, 257) for A2, and 1000->(0, 642, 386) for A3. This is in contrast to embodiments of the present invention, which reflects the percentage values for the product family, that is, the percentages of items in the family to be produced to have the characteristic values, in the individual percentage values for each product, that is, the percentages of items of the products in the family to be produced to have the characteristic values: 1000->(200, 500, 300) for A1, 1000->(200, 500, 300) for A2, and 1000->(0, 500, 300) for A3.

As can be seen in the result for A3, according to the present invention, it can occur that the sum of the values for one characteristic is different from the total for the product. In this case, according to an embodiment of the present invention, the data which are entered for non-defined characteristics values are disaggregated proportionally to the other characteristic values so that the total sum is not changed. This embodiment meets the requirement that the total for the product does not change when the values for the components are modified. According to an embodiment of the present invention, an enhanced consistency condition is applied to a product dependent characteristic. In the example given above, if such a condition is applied, the result is that 1000 pieces, that is, items, are planned for A3 and that the distribution for the chips are 625 items for P3 and 375 items for P4.

By way of example, and to contrast with embodiments of the present invention, the conventional disaggregation logic is now described in a more abstract way: in a drill down situation the values for the respective characteristic values can be maintained and the input will then be disaggregated to the detailed level—i.e. the characteristic value combinations used for storing—according to the proportion the detailed combinations contribute to the displayed detail value. This logic is the same for the absolute and the percentage representation if a proportional disaggregation has been chosen. Whereas other disaggregation types are available, they also do not meet the requirements, achieved by the present invention.

In contrast, according to an embodiment of the present invention, a percentage representation a different logic is useful which allows the user to work on an aggregate and to get equivalent results as those obtained when working on one product. In the absolute values representation a proportional disaggregation is satisfactory. But for the percentage maintenance a "copied" disaggregation logic is provided, that is the disaggregation for the individual products is copied to the product level. This enables the user to maintain a lot of products simultaneously in the desired way. In a further embodiment, the present invention may be carried out with a component oriented logic, which provides an enhanced consistency condition as described above and which is useful when dealing with products whose components do not add up to the total number of products planned.

For the case that the percentage values are maintained sometimes for individual products and sometimes for aggregates of more than one product, the displayed percentage values for the aggregate may be average values of the percentage values of the contributing products. If the displayed value is not the same for each product, an additional symbol may mark the value as an calculated average value. This allows the user to be aware that by changing data on the aggregate level, he/she overwrites data maintained on a more detailed product specific level.

Logic for embodiments of the present invention may be switched on in an interactive Demand Planning by using a start macro which specifies the characteristics for which it is used in the percentage view. The user modifying the transactional data can define a macro in the interactive demand planning with which he/she can define one or more characteristics to which the percentage calculation of the present invention is applied. In one embodiment, this macro is executed once at the beginning of the transaction and it is a trigger which activates the percentage calculation routines if a drill down on one of the specified characteristics is carried out. Such logic may be used when an aggregate of products is used and the drill down is done with respect to a characteristics based forecasting (CBF) characteristic, i.e., a product dependent characteristic used for modeling components. Also, for this CBF characteristic, a consistency enhancing logic, may be used with the percentage representation, consistent with the present invention. If this is not the case, a PopUp will be given when data are changed in the percentage representation for one of the specified characteristics.

In an embodiment of the percentage representation according to the present invention, the percentage normalization is performed on the displayed values and internally the aggregation and disaggregation calculation are identical to the absolute value representation. To achieve this, general algorithms or logic may be changed with respect to conventional percentage representation functions.

Further, more data is read from a data storage system of the demand planning, for example, the LiveCache (LC) than it is done in the standard logic. This is because the data is calculated on more detailed level than displayed and it is not useful to change the standard calculation routines in the LiveCache mainly responsible for aggregation and disaggregation calculations.

The additional calculations and buffering of the data may be done in the CBF specific Advanced Business Application Programming (ABAP) routines, a programming language developed by the applications for application development. In a preferred embodiment, an enhanced consistency logic providing an enhanced consistency condition may be used for resolving problems when the characteristic values are not defined for all the relevant products. However, there are also other possible solutions and the new percentage calculation is not limited to use in a CBF planning process. For example, it may be enhanced to an arbitrary set of characteristics.

Figure 1:
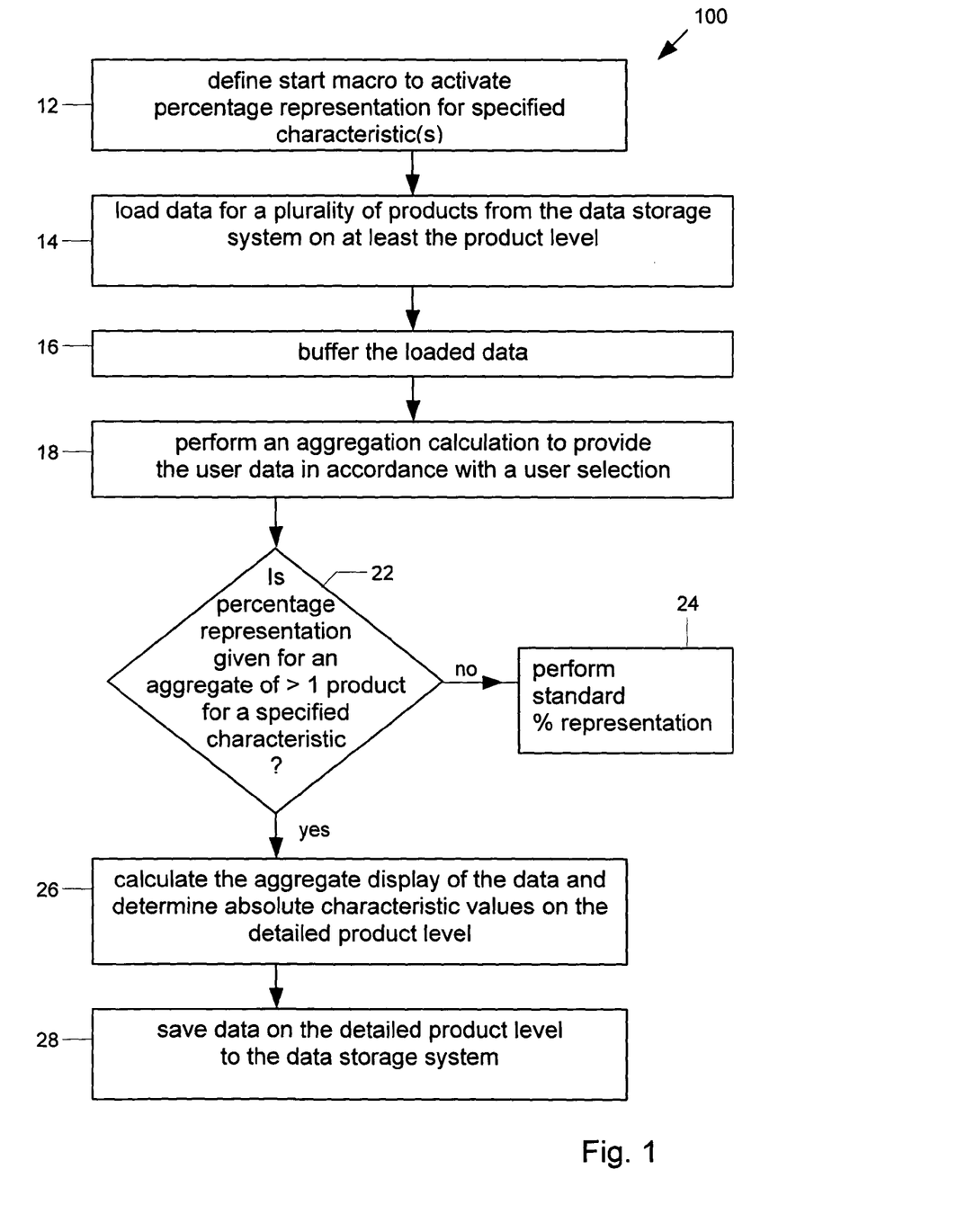
FIG. 1 is a flow chart of an exemplary method for planning demand, in accordance with an embodiment of the present invention.

FIG. 1 shows a flow chart of an exemplary method for planning demand, consistent with an embodiment of the present invention. As can be seen, a process 100 is shown including the steps of: defining a start macro to activate a percentage representation for specified characteristic(s) (step 12). In this way, the start macro is defined, which is used when entering the interactive Demand Planning, in order to activate the percentage calculation for the specified characteristics. If it is not defined, the standard percentage will be carried out. The user is able to specify the characteristics, in particular product dependent characteristics, which he/she desires the percentage calculation to be carried out for.

The process includes the further steps of loading data for a plurality of products from a data storage system, for example, the LiveCache, on at least the product level, independent of a user selection (step 14). The group of products can be specified implicitly or explicitly, but the data is read for each product individually. If the data selected and loaded are only for one product, the standard processes and percentage calculation may be used.

The additionally loaded data is buffered (step 16) and an aggregation calculation is performed (step 18), to provide the user data in accordance with the user selection. In this way, the user is not aware that the data he/she is working with has been loaded on a more detailed level.

As further shown in FIG. 1, the following step is to determine whether a percentage representation is required for an aggregate of more than one product for a specified characteristic (step 22). If it is determined that the answer is "No", a standard percentage representation is carried out (step 24). If it is determined that the answer is "yes", the aggregate display is calculated of the data and absolute characteristic values are determined on the detailed product level. For example, in the case that a drill down on a product dependent characteristic is done for an aggregate of more than one product and that the percentage representation is chosen and that this characteristic is specified in the start macro, the percentage representation calculation of the present invention may be used. In this case, the aggregated display is calculated of the data and the new values are determined on the more detailed product level following from data changes done by the user.

The process includes the further steps of loading data for a plurality of products from a data storage system, for example, the LiveCache, on at least the product level, independent of a user selection (step 14). The group of products can be specified implicitly or explicitly, but the data is read for each product individually. That is, historical data is retrieved including, for characteristic values for products of a family of products, a number of items produced. If the data selected and loaded are only for one product, the standard processes and percentage calculation may be used.

Consistent with another embodiment of the present invention, there is provided a method of planning demand for a configurable product having at least one product dependent characteristic in a managed supply chain, comprising the steps of: providing a data storage system to store data relating to a plurality of configurable products in terms of their respective product dependent characteristics; inputting a selection to be represented for a plurality of products in terms of percentage values for a particular product dependent characteristic, wherein the percentage values relate to respective components or qualities of the particular product dependent characteristic; in response to the inputting step, loading data for the plurality of products from the data storage system on at least the product level; copying the percentage values for the respective components or qualities to the product level; and performing the percentage calculation on the loaded data at the product level to obtain absolute values on the product level. In this way, a user can plan on a group of products, whereas previously it was necessary to work with a single product at a time.

A further embodiment of the invention relates to a similar method that includes the further step of aggregating the absolute values to provide data in accordance with the selection. In this way, the user is presented with his/her desired data. In order to allow any further calculations to be carried out correctly, an additional embodiment of the invention includes the further step of saving the absolute values on the product level to the data storage system.

In a still further embodiment, an enhanced consistency condition is applied with respect to a product dependent characteristic.

Figure 2:
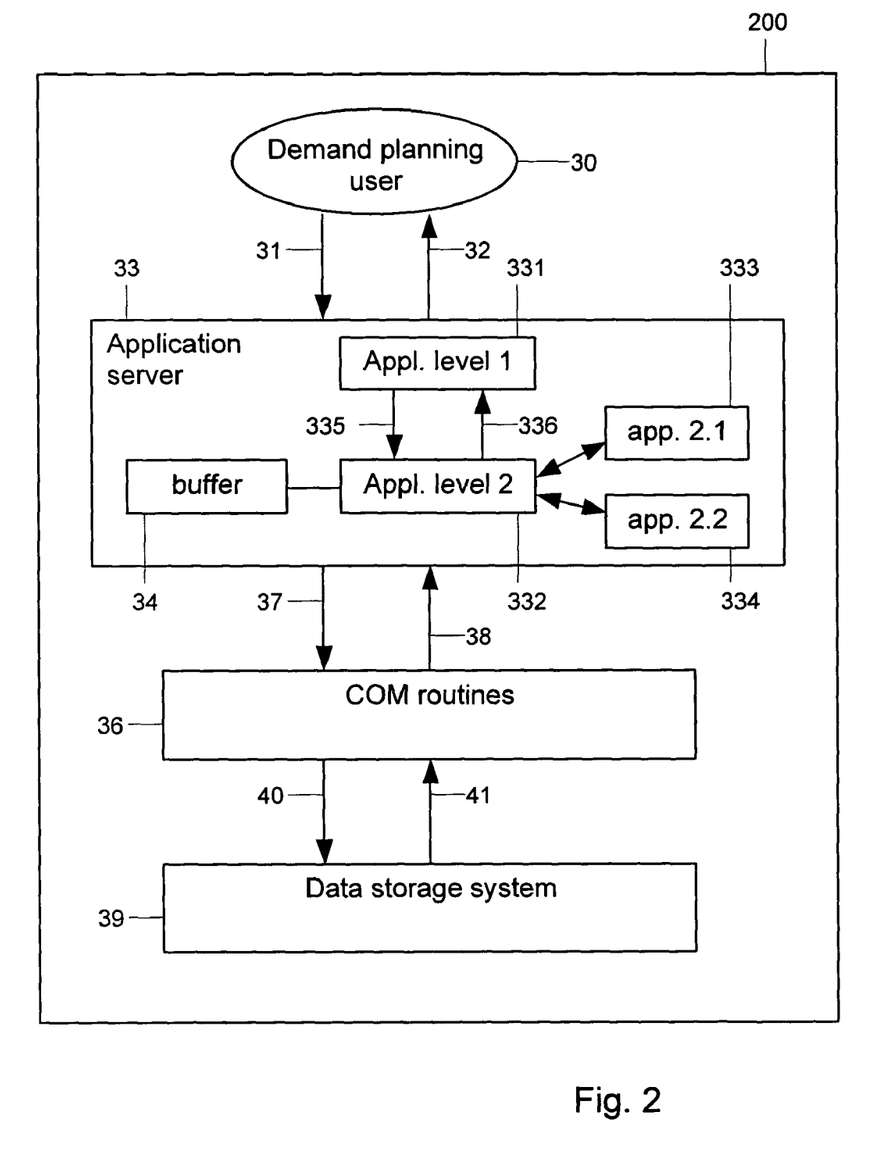
FIG. 2 is a diagram of an exemplary system architecture, in accordance with an embodiment of the present invention.

FIG. 2 shows a diagram of an exemplary system architecture, consistent with an embodiment of the present invention. In particular, FIG. 2 illustrates a system architecture 200 with which the embodiments described above may be implemented, including the data flow and data processing steps initiated by a demand planning apparatus or method with respect to characteristics-based forecasting.

As shown in the example of FIG. 2, the system 200 includes a demand planning user 30 which is a graphic user interface (GUI), with which a user interacts. Typically, the user makes a request or inputs data 31 to an application server 33. In particular, the user inputs a first initial value, at least one second initial value and changed values, if and when desired. Having provided data and/a request, the user receives an output in the form of a delivery of data 32 from the application server 33. In one embodiment, the application server 33 may run the application logic which carries out the demand planning.

The system 200 may further include a programming system 36 for running Common Object Model (COM) routines and defining a network programming system. The COM routines may receive a request or an input of data 37 from the application server. Furthermore, the COM routines deliver data 38 to the application server 33. The function of the COM routines is to carry out data transformation and data calculation. The COM routines are further in association with a data storage system 39, such as an object oriented database, for example, LiveCache. The COM routines send a request or an input of data 40 to the data storage system. The data storage system 39 delivers data 41 to the COM routines.

Returning to the application server 33 and FIG. 2, in one embodiment of the present invention, a demand planner apparatus is provided for planning demand for a configurable product having at least one product dependent characteristic in a managed supply chain, wherein the demand planner is operatively associated with a data storage system to store data relating to a plurality of configurable products in terms of their respective product dependent characteristics, and wherein the demand planner is operatively associated with a user interface for receiving input of a selection to be represented for a plurality of products in terms of percentage values for a particular product dependent characteristic, wherein the percentage values relate to respective components or qualities of the particular product dependent characteristic, the demand planner apparatus comprising: a storage medium having recorded therein processor readable code processable to plan demand for a configurable product in a managed supply chain, the code comprising data loading code processable to load data in response to the selection for the plurality of products from the data storage system on at least the product level, copying code processable to copy the percentage values for the respective components or qualities to the product level, and calculation performing code processable to perform a percentage calculation on the loaded data at the product level to obtain absolute values on the product level.

In one embodiment, the application logic is written in Advanced Business Application Programming (ABAP), a programming language developed by SAP AG (Walldorf, Germany) for application development. However, embodiments of the invention are not limited in this respect and other programming languages are also suitable depending on the particular application or environment in which aspects of the present invention are incorporated into.

Referring again to FIG. 2, the application server 33 may comprise a plurality of application levels 331, 332, 333, 334. The first application level 1 331 may be adapted to carry out the request processing which is input by the demand planning user 30. At this level, the user request may be processed without processing the actual data. Generally, data is not manipulated at the first application level 331. The second application level 332, 333, 334 may be adapted to carry out the data processing. The second application level 2 may comprise two sub levels, including: a second application level 2.1 333 that is adapted to carry out a high level of data processing and a second application level 2.2 334 that is adapted to carry out a low level of data processing. In other words, the second application level 2.1 333 is adapted to carry out more general data processing than the second application level 2.2 334. In one embodiment, the percentage calculation is carried out by the more general second application level 2.1 333.

The application server 33 may be arranged to carry out CBF. To achieve this, the application logic carries out the functions of performing a CBF data transformation, a CBF data calculation on a higher level by second application level 2.1, and a CBF data calculation at a lower level by second application level 2.2. In order to carry out the data calculations, a buffer 34 may be provided in to which the master data of the implicitly selected products is loaded. In one embodiment, the data to be processed is structured in a table within the buffer 34.

Consistent with an embodiment of the invention, data is modeled using internal tables in the buffer. Several entries and more fields are used which model the relationship between owner and members. In particular, with respect to a specific drill down, the buffer table structure allows owners and members to be identified, so that the desired data is extracted.

It will be understood that depending on the other applications comprised or provided in system 200, the system may include a plurality of GUIs and applications. Further, although only one GUI and application are shown in FIG. 2, other GUIs and/or applications may also be comprised in the system.

In a demand planning application, the internal logic for dealing with characteristic-based forecasting data may incorporate one or more of the following. The data are stored in a data storage system 39, for example, an object oriented data storage system, such as LiveCache (LC). The data are typically represented with three technical characteristics for profile, table, and row. The presentation of the data for the application uses the CBF characteristics which describe the features of specific products. The calculation required between the internal representation of the CBF data and the application representation of the data are done in a characteristic calculation function group on the application server 33. The CBF calculations in this function group are based on the data of the global internal table. The data read from the data storage system, for example, LiveCache (LC), are stored there together with all the results stored in the buffer 34 together with all the results calculated in order to provide data to the application server 33.

Embodiments of the invention described herein can be implemented in digital electronic circuitry, or in computer hardware, firmware, software, or in any combination thereof. An apparatus according to the present invention can be implemented in a computer program product tangibly embodied in a machine readable storage device for execution by a programmable processor. Further, method steps according to the invention can be performed by a programmable processor executing a program of instructions to perform functions of the invention by operating on input data and generating output. Embodiments of the invention can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Typically, a processor will receive instructions and data from a read-only memory and/or a random access memory. Typically, a computer will include one or more mass storage devices for storing data files; such devices include magnetic disks, such as internal hard disks and removeable disks; magneto-optical disks; and optical disks. Storage devices suitable for tangibly embodying computer program instructions and data include all forms of nonvolatile memory, including by way of example, semiconductor memory devices, such as EEPROM, and flash memory devices; magnetic disks such as internal hard disks and removable disks; magneto-optical disks; and CD-ROM disks. Any of the foregoing can be supplemented by, or incorporated in ASICs (application specific integrated circuits).

To provide for interaction with a user, embodiments of the present invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

While specific embodiments of the invention have been described above, it will be appreciated that the invention may be practiced otherwise than as described. In the embodiments described, certain products, characteristics and other parameters are referred to. The present invention is not limited to these particular products, characteristics or other parameters, and these are given by way of example only. Embodiments of the present invention have broad application to the demand planning of any product, including configurable products. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer-implemented method for planning demand for a product with at least one product-dependent characteristic represented by a characteristic value, the method comprising steps, performed by one or more processors, of:
   retrieving, from a data storage system, historical data including, for characteristic values for products of a family of products, the number of items produced;
   defining percentages of items in the family to be produced to have the characteristic values;
   determining percentages of items of the products in the family to be produced to have the characteristic values, based on at least the defined percentages of items in the family; and
   calculating, for the products in the family, numbers of items to be produced to have the characteristic values, based on at least the retrieved historical data and the determined percentages of items of the products;
   determining, for at least one of the products in the family, that a planned number of items to be produced exceeds a sum of the calculated number of items to be produced; and
   modifying the calculated numbers of items to be produced for the at least one of the products, based on at least a relationship between the planned number of items and the sum, wherein the modifying maintains constant a number of items of the at least one of the products in the retrieved historical data.

2. The method of claim 1, further comprising:
   aggregating the calculated numbers of items of the products to provide data related to the product-dependent characteristic.

3. The method of claim 1, further comprising:
   saving the calculated numbers of items of the products to the data storage system.

4. The method of claim 1, wherein the defining comprises:
   specifying the product-dependent characteristic; and
   defining a macro to include the specified product-dependent characteristic.

5. The method of claim 4, wherein the calculating comprises:
   calculating, in accordance with the defined macro, the numbers of items of the products to be produced for the specified product-dependent characteristic.

6. A demand planner for planning demand for a product with at least one product-dependent characteristic represented by a characteristic value, wherein the demand planner is operatively associated with a data storage system to store historical data including, for characteristic values for products of a family of products, numbers of items produced, and wherein the demand planner is operatively associated with a user interface for receiving input of product-dependent characteristic, the demand planner comprising:
   a processor; and
   a storage medium storing a program for controlling the processor, wherein the processor, being operative with the program, is configured to:
      percentages of items in the family to be produced to have the characteristic values;
      retrieve at least a portion of the historical data from the data storage system;
      determine percentages of items of the products in the family to be produced to have the characteristic values, based on at least the defined percentages of items in the family; and
      calculate numbers of items of the products to be produced based on at least the retrieved historical data and the determined percentages of items of the products, wherein the calculating maintains constant a number of items of at least one product in the retrieved historical data.
      calculating, for the products in the family, numbers of items to be produced to have the characteristic values, based on at least the retrieved historical data and the determined percentages of items of the products;
      determine, for at least one of the products in the family, that a planned number of items to be produced exceeds a sum of the calculated number of items to be produced; and
      modify the calculated numbers of items to be produced for the at least one of the products, based on at least a relationship between the planned number of items and the sum, wherein the modifying maintains constant a number of items of the at least one of the products in the retrieved historical data.

7. The demand planner of claim 6, wherein the processor is further configured to:
   calculated numbers of items of the products to provide data in accordance with the product-dependent characteristic.

8. The demand planner of claim 6, wherein the processor is further configured to:
   save the calculated numbers of items of the products to the data storage system.

9. A computerized system for planning demand for a product with at least one product-dependent characteristic represented by a characteristic value, comprising:
   a processor;
   a data storage system coupled to the processor to store historical data including, for characteristic values for products of a family of products, numbers of items produced;
   a module configured to use the processor to define percentages of items in the family to be produced to have the characteristic values;
   a module configured to use the processor to retrieve, from the data storage system, at least a portion of the historical data;
   a module configured to use the processor to determine percentages of items of the products in the family to be produced to have the characteristic values, based on at least the defined percentages of items in the family; and
   a module configured to use the processor to calculate, for the products in the family, numbers of items to be produced to have the characteristic values, based on at least the retrieved historical data and the determined percentages of items of the products;
   a module for determining, using the processor, for at least one of the products in the family, that a planned number of items to be produced exceeds a sum of the calculated number of items to be produced; and a module for modifying, using the processor, the calculated numbers of items to be produced for the at least one of the products, based on at least a relationship between the planned number of items and the sum, wherein the modifying maintains constant a number of items of the at least one of the products in the retrieved historical data.

10. The computerized system of claim 9, further comprising:
a module configured to aggregate the calculated numbers of items of the products to provide data in accordance with the product-dependent characteristic.

11. The computerized system of claim 9, further comprising:
a module configured to save the calculated numbers of items of the products to the data storage system.

12. The computerized system of claim 9, wherein the module configured to define is further configured to:
specify the product-dependent characteristic; and
define a macro to include the specified product-dependent characteristic.

13. The computerized system of claim 12, wherein the module configured to calculate is further configured to:
calculate, in accordance with the defined macro, the numbers of items of the products to be produced for the product-dependent characteristic.

14. A program storage device storing instructions that, when executed by a processor, perform a method, comprising the steps of:
defining percentages of items in a family of products to be produced to have characteristic values of a product-dependent characteristic;
retrieving a portion of historical data, the historical data including, for the characteristic values for the products of the family, numbers of items produced;
determining percentages of items of the products in the family to be produced to have the characteristic values, based on at least the defined percentages of items in the family; and
calculating, for the products in the family, numbers of items to be produced to have the characteristic values, based on at least the retrieved historical data and the determined percentages of items of the products;
determining, for at least one of the products in the family, that a planned number of items to be produced exceeds a sum of the calculated number of items to be produced; and
modifying the calculated numbers of items to be produced for the at least one of the products, based on at least a relationship between the planned number of items and the sum, wherein the modifying maintains constant a number of items of the at least one of the products in the retrieved historical data.

15. The program storage device of claim 14, wherein the method further comprises:
aggregating the calculated numbers of items of the products to provide data in accordance with the product-dependent characteristic.

16. The program storage device of claim 14, wherein the method further comprises:
saving the calculated numbers of items of the products to the data storage system.

17. The method of claim 1, wherein the defining comprises:
specifying one or more additional product-dependent characteristics; and
defining a macro to include each of the one or more additional product-dependent characteristics.

18. The method of claim 17, wherein, in accordance with the defined macro:
the defining comprises defining, for the one or more additional product-dependent characteristics, percentages of items in the family to be produced;
the determining comprises determining, for each of the one or more additional product-dependent characteristics, percentages of items of the products in the family to be produced to have the characteristic values, based on at least the defined percentages of items in the family; and
the calculating comprises calculating, for the one or more additional product-dependent characteristics, numbers of items of the products to be produced.

19. The computerized system of claim 9, wherein the module configured to define is further configured to:
specify one or more additional product-dependent characteristics; and
define a macro to include each of the one or more additional product-dependent characteristics.

20. The computerized system of claim 19, wherein, in accordance with the defined macro:
the module configured to define is further configured to define, for the one or more additional product-dependent characteristics, percentages of items in the family to be produced;
the module configured to determine is further configured to determine, for the one or more additional product-dependent characteristics, percentages of items of the products in the family to be produced to have the characteristic values, based on at least the defined percentages of items in the family; and
the calculating comprises calculating, for the one or more additional product-dependent characteristics, numbers of items of the products to be produced.

* * * * *